(12) United States Patent
Tateno et al.

(10) Patent No.: US 10,656,455 B2
(45) Date of Patent: May 19, 2020

(54) ELECTRO-OPTICAL DEVICE, TRANSMISSIVE LIQUID CRYSTAL DISPLAY DEVICE, AND ELECTRONIC DEVICE

(71) Applicant: SEIKO EPSON CORPORATION, Tokyo (JP)

(72) Inventors: Yoshitake Tateno, Chitose (JP); Satoshi Ito, Eniwa (JP); Daisuke Sawaki, Shiojiri (JP); Mitsutaka Ohori, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/926,316

(22) Filed: Mar. 20, 2018

(65) Prior Publication Data

US 2018/0314086 A1 Nov. 1, 2018

(30) Foreign Application Priority Data

Apr. 26, 2017 (JP) .................................. 2017-086946

(51) Int. Cl.
*G02F 1/1335* (2006.01)
*G02F 1/1333* (2006.01)
*G02F 1/225* (2006.01)

(52) U.S. Cl.
CPC .. *G02F 1/133512* (2013.01); *G02F 1/133345* (2013.01); *G02F 1/133524* (2013.01); *G02F 1/225* (2013.01)

(58) Field of Classification Search
CPC ......... G02F 1/136209; G02F 1/133512; G02F 1/133502; G02F 1/133345; G02F 1/133526
See application file for complete search history.

(56) References Cited

U.S. PATENT DOCUMENTS 4,781,441 A * 11/1988 Kanbe .................... G02F 1/132 349/1
9,857,621 B1 * 1/2018 Gu .................... G02F 1/133526
(Continued)

FOREIGN PATENT DOCUMENTS

JP 3991569 B2 10/2007
JP 2011-186283 A 9/2011
(Continued)

*Primary Examiner* — Thanh Nhan P Nguyen
(74) *Attorney, Agent, or Firm* — Oliff PLC (57) ABSTRACT

An electro-optical device includes a pixel electrode, a light shielding member disposed along an edge of the pixel electrode in a planar view viewed in a thickness direction that is a direction perpendicular to the pixel electrode, a first insulator that is provided in a region overlapped with at least the light shielding member in the planar view, and having light transmission, and a second insulator that is provided to be in contact with the first insulator on an opening region that is an inside surrounded by the light shielding member in the planar view, and having the light transmission and a refractive index higher than that of the first insulator, in which the second insulator configures a waveguide which reflects incident light incident on the opening region at an interface between the second insulator and the first insulator, and propagates the incident light inside the second insulator.

20 Claims, 6 Drawing Sheets

(56) References Cited

U.S. PATENT DOCUMENTS

| | | | | |
|---|---|---|---|---|
| 2004/0008295 A1* | 1/2004 | Ueda | ................. | G02F 1/136209 349/44 |
| 2009/0231529 A1* | 9/2009 | Aota | ................. | G02F 1/133345 349/123 |
| 2012/0249911 A1* | 10/2012 | Kamino | ............ | G02F 1/136209 349/42 |

FOREIGN PATENT DOCUMENTS

| | | |
|---|---|---|
| JP | 2011-191475 A | 9/2011 |
| JP | 2012-208449 A | 10/2012 |
| JP | 2013-073181 A | 4/2013 |
| JP | 2015-197578 A | 11/2015 |
| JP | 2016-080956 A | 5/2016 |

* cited by examiner

ELECTRO-OPTICAL DEVICE, TRANSMISSIVE LIQUID CRYSTAL DISPLAY DEVICE, AND ELECTRONIC DEVICE

BACKGROUND

1. Technical Field

The present invention relates to an electro-optical device, a transmissive liquid crystal display device, and an electronic device.

2. Related Art

A liquid crystal display device including a liquid crystal layer between an element substrate provided with a plurality of pixel electrodes and switching elements and a counter substrate disposed opposite to the element substrate is known. In correspondence with each pixel electrode, an opening region which is a region transmitting light is provided. In the liquid crystal display device, a technology for suppressing incident light from deviating from the opening region in order to improve light utilization efficiency and prevent light irradiation to a switching element (semiconductor element) is demanded.

For example, in a technology described in Japanese Patent No. 3,991,569, in an opening region of an element substrate, a concave portion (this is referred to as first concave portion) is formed on an interlayer insulating film (this is referred to as first interlayer insulating film) made of a silicon oxide film, a transparent film made of silicon nitride film is formed on the first concave portion, a concave portion (this is referred to as second concave portion) is also formed on the transparent film, and an interlayer insulating film (this is referred to as second interlayer insulating film) made of a silicon oxide film is formed by completely filling the second concave portion. A side surface of the second concave portion is an optical surface perpendicular to the substrate.

Light obliquely incident on the counter substrate and reaching the opening region of the element substrate is incident on the optical surface from a second interlayer insulating film side, reflected by the optical surface, and is guided to a second interlayer insulating film side, that is, to inside the opening region (see FIG. 10 and FIG. 11 of Japanese Patent No. 3,991,569).

However, in a technology described in Japanese Patent No. 3,991,569, a complicated structure (structure in which transparent film is formed on first concave portion of first interlayer insulating film and second interlayer insulating film is further formed on second concave portion of transparent film) is required.

SUMMARY

An advantage of some aspects of the invention is to provide a technology which can suppress light from deviating from an opening region by a new and simple structure in an electro-optical device such as a liquid crystal display device and an electronic device including the electro-optical device.

According to an aspect of the invention, there is provided an electro-optical device including: a pixel electrode; a light shielding member that is provided along an edge of the pixel electrode in a planar view viewed in a thickness direction that is a direction perpendicular to the pixel electrode; a first insulator that is provided in a region overlapped with at least the light shielding member in the planar view, and having light transmission; and a second insulator that is provided to be in contact with the first insulator on an opening region surrounded by the light shielding member in the planar view, and having the light transmission and a refractive index higher than that of the first insulator, in which the second insulator configures a waveguide which reflects incident light incident on the opening region at an interface between the second insulator and the first insulator, and propagates the incident light inside the second insulator.

According to the configuration, as compared to a case where the second insulator is not provided, it is possible to suppress deviation of light from the opening region. By a simple structure in which the second insulator is provided on the opening region, it is possible to suppress the deviation of light from the opening region.

In the electro-optical device, the electro-optical device may further include a semiconductor element that is provided in a position in which a first light shielding layer and a second light shielding layer are overlapped with each other in the planar view, and provided between the first light shielding layer and the second light shielding layer in the thickness direction, in which the light shielding member includes the first light shielding layer and the second light shielding layer disposed in a position different from that of the first light shielding layer in the thickness direction, and a portion that is overlapped with the first light shielding layer in the planar view, and a range in which the second insulator is disposed in the thickness direction includes a range from a surface facing a semiconductor element side of the first light shielding layer to a surface facing a semiconductor element side of the second light shielding layer in the thickness direction. According to the configuration, it is possible to suppress irradiation of the incident light to the semiconductor element.

In the electro-optical device, the second insulator may be disposed by being separated from an inside of the opening region with respect to an edge of the light shielding member and provided in contact with the first insulator in the planar view. According to the configuration, it is possible to suppress reflection of the incident light by the edge of the light shielding member.

In the electro-optical device, the waveguide may totally reflect and propagate the incident light incident on the interface. According to the configuration, by generating total reflection on the interface, it is possible to efficiently propagate the incident light inside the second insulator.

In the electro-optical device, an interface between the first insulator and the second insulator may form an angle in a range of 90°±10° with respect to the pixel electrode. According to the configuration, the total reflection of the incident light at the interface easily occurs.

According to another aspect of the invention, there is provided a transmissive liquid crystal display device including a plurality of pixels having an opening region and transmitting incident light through the opening region, the device includes: a pixel electrode that is provided in the opening region of the pixel; a light shielding layer that is provided in a non-opening region surrounding the opening region; a first insulator that is provided in the non-opening region, and overlaps at least a part of the first insulator with the light shielding layer; and a second insulator that is provided in a region in which at least a part of the second insulator is overlapped with the pixel electrode, and provided in the entire region surrounded by the first insulator, in which a refractive index of the second insulator higher than that of the first insulator, and light propagates in the second insulator by totally reflecting the light incident on the opening region, in an interface between the first insulator and the second insulator.

According to the configuration, as compared to a case where the second insulator is not provided, it is possible to suppress deviation of light from the opening region.

According to still another aspect of the invention, there is provided an electronic device including the electro-optical device or the transmissive liquid crystal display device.

According to the configuration, in the electro-optical device or the transmissive liquid crystal display device included in the electronic device, by the second insulator, it is possible to suppress the deviation of light from the opening region.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings and the like. However, in each figure, the dimensions and scales of each part are appropriately different from the actual ones. In addition, since the embodiments described below are preferable specific examples of the invention, various technical limitations are given, but the scope of the invention is not limited to these forms unless otherwise stated to limit the invention in the following description.

Embodiment

As one embodiment of the invention, an active matrix type liquid crystal display device 100 including a thin film transistor (TFT) as a switching element of a pixel is exemplified.

Figure 1:
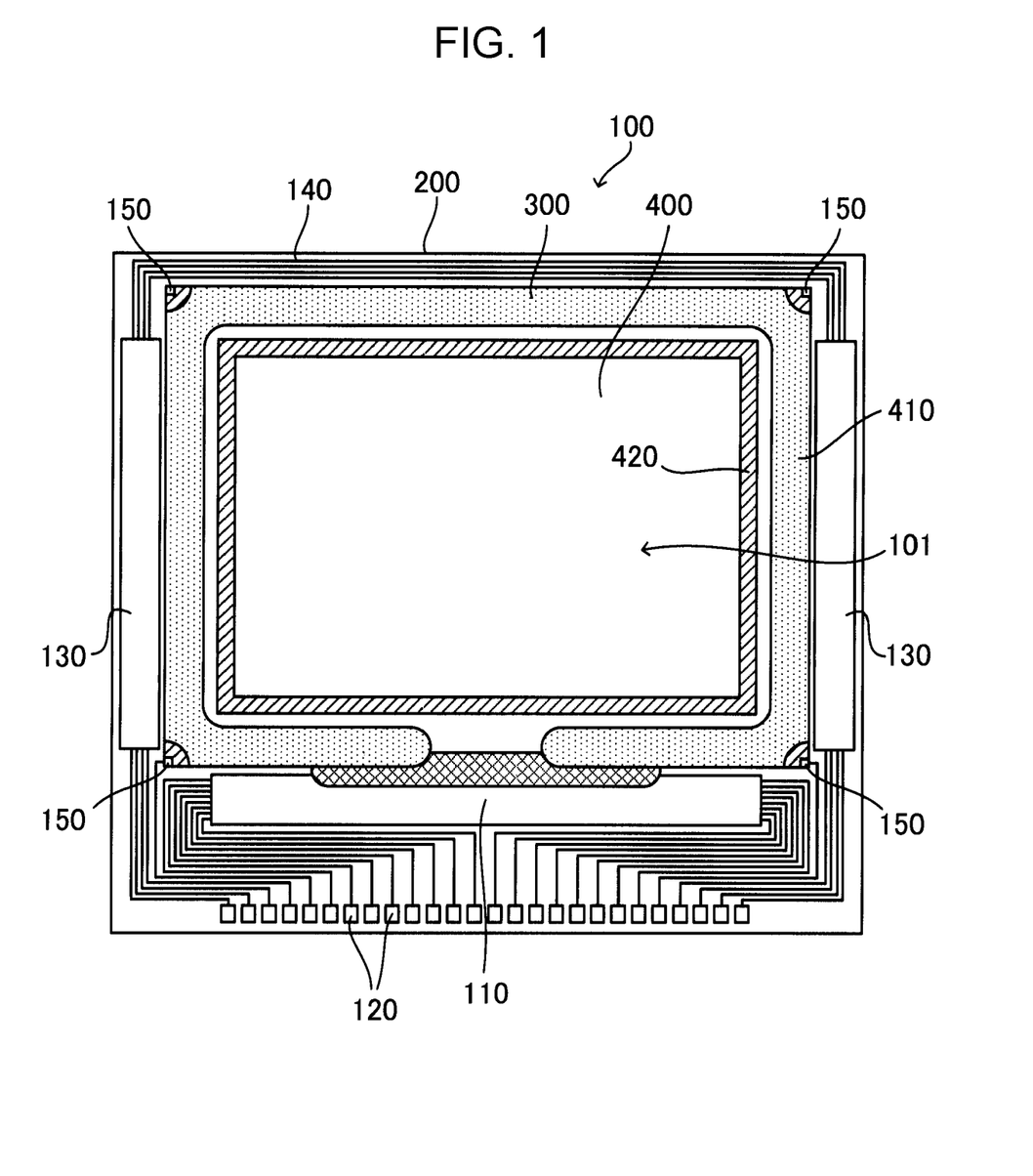
FIG. 1 is a schematic planar view showing a configuration of a liquid crystal display device according to an embodiment.

FIG. 1 is a schematic planar view showing an example of an overall configuration of the liquid crystal display device 100. The liquid crystal display device 100 includes an element substrate 200, a counter substrate 300 disposed opposite to the element substrate 200, and a liquid crystal layer 400 disposed between the element substrate 200 and the counter substrate 300.

The element substrate 200 and the counter substrate 300 are bonded by a sealing material 410 disposed in a frame shape. The liquid crystal layer 400 is configured with a liquid crystal having positive or negative dielectric anisotropy sealed in a space surrounded by the element substrate 200, the counter substrate 300, and the sealing material 410.

For example, the sealing material 410 is made of an adhesive such as a thermosetting or ultraviolet curable epoxy resin. In the sealing material 410, a spacer for maintaining a constant interval between the element substrate 200 and the counter substrate 300 is mixed. A peripheral portion 420 made of a light-shielding material is formed inside a formation region of the sealing material 410. The inside of the peripheral portion 420 is a display region 101 in which a plurality of pixels are arranged.

On a region outside the sealing material 410, a data line driving circuit 110 and an external circuit mounting terminal 120 are provided along one side of the element substrate 200 and a scanning line driving circuit 130 is provided along two sides adjacent to the one side. On the remaining side of the element substrate 200, a plurality of wirings 140 for connecting between the scanning line driving circuits 130 on both sides are provided. At the corner portion of the counter substrate 300, an inter-substrate conducting material 150 for providing electrical conduction between the element substrate 200 and the counter substrate 300 is provided.

For example, the liquid crystal display device 100 is operated in a twisted nematic (TN) mode or a vertical alignment (VA) mode. For example, the liquid crystal display device 100 is used as a transmissive display device that modulates light incident from a counter substrate 300 side and emits light to an element substrate 200 side.

Figure 2:
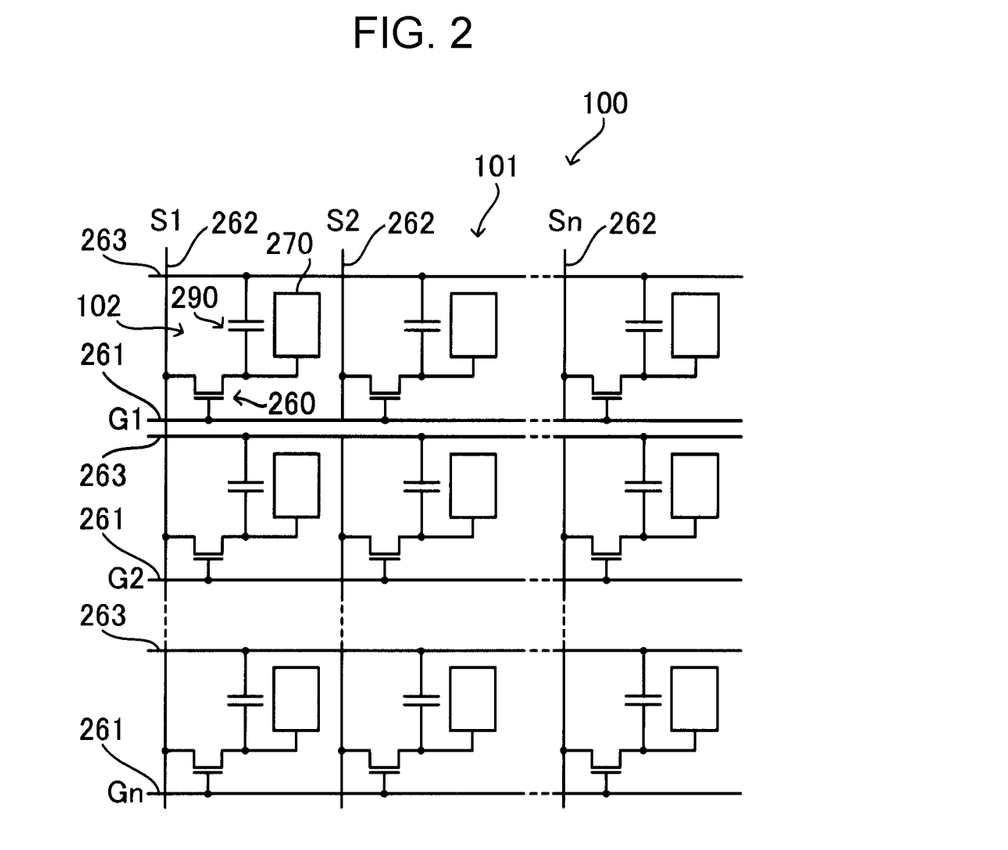
FIG. 2 is an equivalent circuit diagram showing an electrical configuration of the liquid crystal display device according to the embodiment.

FIG. 2 is an equivalent circuit diagram showing an example of an electrical configuration of the liquid crystal display device 100. A plurality of pixels 102 are arranged in a matrix on the display region 101. A pixel electrode 270 and a TFT 260 are provided on each pixel 102. In each pixel 102, the pixel electrode 270 and the TFT 260 are provided. In addition, each pixel 102 includes an opening region 272 (see FIG. 4) (which will be described below), and the pixel electrode 270 is provided in the opening region 272 of each pixel 102. A source electrode of the TFT 260 is electrically connected to a data line 262 extending from the data line driving circuit 110 (see FIG. 1). Image signals (data signals) S1, S2, . . . , Sn are sequentially supplied from the data line driving circuit 110 to the data line 262. A gate electrode of the TFT 260 is electrically connected to a scanning line 261 extending from the scanning line driving circuit 130 (see FIG. 1). Scanning signals G1, G2, . . . , Gn are sequentially supplied from the scanning line driving circuit 130 to the scanning line 261. A drain electrode of the TFT 260 is electrically connected to the pixel electrode 270.

The image signal S1, S2, . . . , Sn are written into the pixel electrode 270 at a predetermined timing through the data line 262 by turning on the TFT 260 for a certain period. The image signal of a predetermined level written in the liquid crystal layer 400 through the pixel electrode 270 in this manner is held for a certain period by liquid crystal capacitance formed with a common electrode 370 (see FIG. 3) provided in the counter substrate 300.

In order to prevent the held image signal S1, S2, . . . , Sn from leaking, a storage capacitor 290 is formed between the pixel electrode 270 and a capacitor line 263, and disposed in parallel to the liquid crystal capacitance. In this manner, a voltage signal is applied to a liquid crystal of each pixel 102 and an alignment state of the liquid crystal is changed according to the applied voltage level such that light incident on the liquid crystal layer 400 (see FIG. 3) is modulated and gradation display becomes possible.

Figure 3:
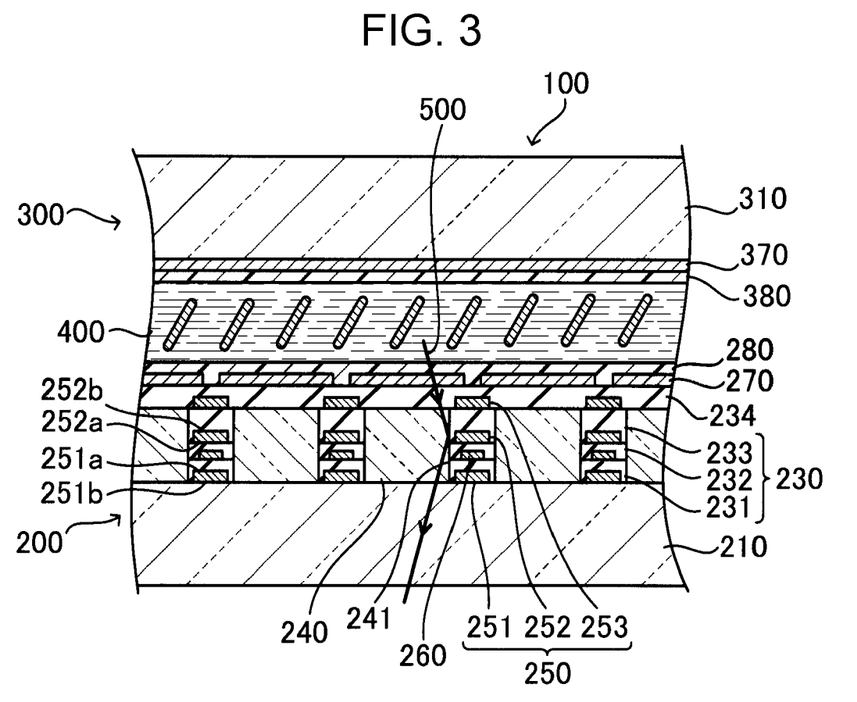
FIG. 3 is a schematic sectional view showing a configuration of the liquid crystal display device according to the embodiment.

FIG. 3 is a schematic sectional view showing an example of a configuration of the liquid crystal display device 100. Viewing the liquid crystal display device 100 in a direction (direction perpendicular to surface of pixel electrode 270 facing liquid crystal layer 400 side) perpendicular to the pixel electrode 270 is referred to as a planar view. A direction perpendicular to the pixel electrode 270 may be referred to as a thickness direction. Viewing the liquid crystal display device 100 in a direction perpendicular to a plane on which a base member 210 of the element substrate 200 is configured or a direction perpendicular to a plane on which a base member 310 of the counter substrate 300 is configured may be referred to as the planar view.

Hereinafter, for the convenience of description, with respect to the element substrate 200, the liquid crystal layer 400 side may be referred to as an upper side and with respect to the counter substrate 300, and the liquid crystal layer 400 side may be referred to as an upper side.

The element substrate 200 includes the base member 210, an insulating layer 231, an insulating layer 232, an insulating layer 233, an insulating layer 234, a high refractive index insulator 240, a light shielding layer 251, a light shielding layer 252, a light shielding layer 253, a TFT 260, the pixel electrode 270, and an alignment film 280. On an upper side of the base member 210 (liquid crystal layer 400 side), the insulating layer 231, and the like, the high refractive index insulator 240, the light shielding layer 251, the TFT 260, the pixel electrode 270, the alignment film 280, and the like are provided.

The base member 210 is configured with a material of light transmission which transmits visible light, for example, glass, quartz, or the like. The light shielding layer 251 is formed on the base member 210. The light shielding layer 251 is configured with a material of the light transmission which transmits visible light, for example, polysilicon, metal, metal silicide, a metal compound, or the like. The light shielding layer 252 and the light shielding layer 253 can also be configured with the same material as the light shielding layer 251.

On the base member 210 covering the light shielding layer 251, the insulating layer 231 is formed. The insulating layer 231 is configured with a material of insulation and light transmission, for example, silicon oxide or the like. The insulating layer 232, the insulating layer 233, and the insulating layer 234 can be configured with the same material as that of the insulating layer 231.

The TFT 260 is formed on the insulating layer 231. The TFT 260 includes a semiconductor layer, a source region, a channel region, and a drain region of a transistor are provided on the semiconductor layer. The insulating layer 232 is formed on the insulating layer 231 covering the TFT 260. The light shielding layer 252 is formed on the insulating layer 232. As the light shielding layer 252, it is possible to use, for example, the scanning line 261 (see FIG. 2). The insulating layer 233 is formed on the insulating layer 232 covering the light shielding layer 252.

The light shielding layer 251 (first light shielding layer) and the light shielding layer 252 (disposed in position different from light shielding layer 251 in thickness direction) (second light shielding layer) are overlapped with each other in the planar view. The TFT 260 (semiconductor element and switching element) is provided in a position in which the light shielding layer 251 and the light shielding layer 252 are overlapped with each other in the planar view, and provided between the light shielding layer 251 and the light shielding layer 252 in the thickness direction. The insulating layer 231 is provided in the vicinity of the light shielding layer 251 of covering the light shielding layer 251, the insulating layer 232 is provided in the vicinity of the TFT 260 by covering the TFT 260 and the insulating layer 233 is provided in the vicinity of the light shielding layer 252 by covering the light shielding layer 252.

On a region on which the insulating layer 231, the insulating layer 232, and the insulating layer 233 of the base member 210 are not provided, the high refractive index insulator 240 is formed in a range of a thickness to an upper surface of the insulating layer 233. The high refractive index insulator 240 is configured with a material of insulation and light transmission, for example, silicon oxynitride, silicon nitride, or the like. As the material configuring the high refractive index insulator 240, a material of which the refractive index with respect to the visible light is higher than the refractive index of the material configuring the insulating layer 231, the insulating layer 232, and the insulating layer 233 (low refractive index insulator 230 described later) is used.

On the insulating layer 233 of a surface configured with the insulating layer 233 and the high refractive index insulator 240, the light shielding layer 253 is formed. As the light shielding layer 253, it is possible to use, for example, a data line 262 (see FIG. 2). The light shielding layer 253 is overlapped with the light shielding layer 251 and the light shielding layer 252 in the planar view. On the insulating layer 233 and the high refractive index insulator 240 covering the light shielding layer 253, the insulating layer 234 is formed.

The pixel electrode 270 is formed on the insulating layer 234. The pixel electrode 270 is configured with a material of conductivity and light transmission, for example, indium tin oxide (ITO), indium zinc oxide (IZO), or the like. An alignment film 280 is formed on the insulating layer 234 covering the pixel electrode 270. The alignment film 280 is configured with, for example, polyimide, silicon oxide, or the like.

An insulating layer having the refractive index lower than that of the high refractive index insulator 240 which is provided in a range in the thickness direction in which the high refractive index insulator 240 (second insulator) is disposed and provided in contact with the high refractive index insulator 240 in the planar view, is collectively referred to as a low refractive index insulator 230 (first insulator). In this example, the insulating layer including the insulating layer 231, the insulating layer 232, and the insulating layer 233 collectively form the low refractive index insulator 230. In addition, the light shielding layer 251, the light shielding layer 252, and the light shielding layer 253 are collectively referred to as a light shielding member 250.

The counter substrate 300 includes the base member 310, the common electrode 370, and an alignment film 380. On an upper side of the base member 310 (on liquid crystal layer 400 side), the common electrode 370 and the alignment film 380 are provided.

The base member 310 is configured with the material of the light transmission, for example, the glass, the quartz, or the like. The common electrode 370 is formed on the base member 310. The common electrode 370 is configured with the material of the conductivity and the light transmission, for example, indium tin oxide (ITO), indium zinc oxide (IZO), or the like. The alignment film 380 is formed on the common electrode 370. The alignment film 380 is configured with, for example, polyimide, silicon oxide, or the like.

Figure 4:
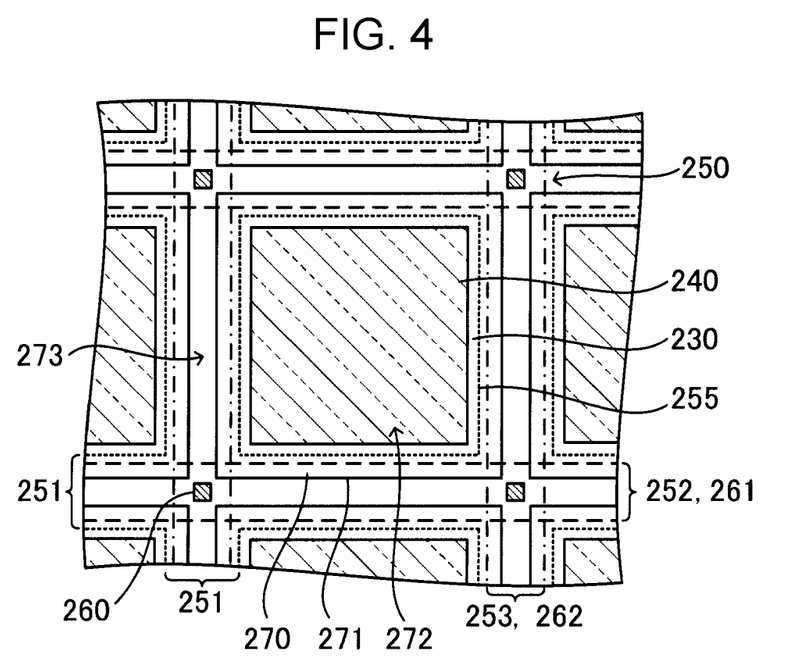
FIG. 4 is a schematic planar view showing a configuration in the vicinity of a pixel electrode.

FIG. 4 is a schematic planar view showing an example of a configuration in the vicinity of the pixel electrode 270, and shows a positional relationship between the low refractive index insulator 230, the high refractive index insulator 240, the light shielding member 250, the TFT 260, and the pixel electrode 270 in the planar view. FIG. 3 is a sectional view obtained by selecting an appropriate position (path) in the planar view so as to show a schematic configuration of the low refractive index insulator 230, the high refractive index insulator 240, the light shielding member 250, the TFT 260, and the pixel electrode 270, in a sectional view taken in a direction perpendicular to the thickness direction.

In FIG. 4, the pixel electrode 270 is indicated by a solid line. The light shielding layer 251 is indicated by a dotted line, the light shielding layer 252 configured by the scanning line 261 is indicated by a broken line, and the light shielding layer 253 configured by the data line 262 is indicated by a dashed line. The high refractive index insulator 240 is indicated by a hatched region in which a solid line and a dashed line in left upward are alternately repeated, and the low refractive index insulator 230 is indicated by a non-hatched (white) region (open region). The TFT 260 is indicated by a region hatched by a solid line in left upward.

Here, the direction along one side where the data line driving circuit 110 (see FIG. 1) is provided is an X direction, and two sides opposed to each other and perpendicular to the one side, that is, a direction along two sides in which the scanning line driving circuit 130 (see FIG. 1) is provided is a Y direction. As a direction perpendicular to the X direction and the Y direction is a Z direction, viewing the liquid crystal display device 100 from the Z direction may be referred to as the planar view.

The pixel electrode 270 is a rectangular shape having a pair of sides extending in the X direction and another pair of sides extending in the Y direction. A plurality of the pixel electrodes 270 are arranged in a matrix so that a row extending in the X direction and a column extending in the Y direction are configured.

The light shielding layer 251 is provided in a mesh shape so as to cover a gap extending in the X direction between rows of the pixel electrodes 270 and a gap extending the Y direction between columns of the pixel electrodes 270 in the Y direction. The light shielding layer 251 is provided to cover an edge portion of the pixel electrode 270, and the gap between the pixel electrodes 270 adjacent in the X direction and the gap between the pixel electrodes 270 adjacent in the Y direction are covered with the light shielding layer 251 over the entire width.

The light shielding layer 252 (scanning line 261) is provided to cover the gap extending between the rows of the pixel electrode 270 in the X direction. The light shielding layer 252 is provided to cover an edge of the pixel electrode 270, and a gap between the pixel electrodes 270 adjacent in the Y direction is covered with the light shielding layer 252 over the entire width.

The light shielding layer 253 (data line 262) is provided to cover the gap extending the Y direction between the rows of the pixel electrodes 270. The light shielding layer 253 is provided to cover the edge portion of the pixel electrode 270, and the gap between the pixel electrodes 270 adjacent in the X direction is covered with the light shielding layer 253 over the entire width.

Therefore, the light shielding member 250 including the light shielding layer 251, the light shielding layer 252, and the light shielding layer 253 are provided in a mesh shape so as to cover the gap extending between the rows of the pixel electrode 270 in the X direction, and the gap extending between the rows of the pixel electrodes 270 in the Y direction. The light shielding member 250 is provided to cover the edge portion of the pixel electrode 270, the gap between the pixel electrodes 270 adjacent in the X direction and the gap between the pixel electrodes 270 adjacent in the Y direction are covered with the light shielding member 250 over the entire width.

The light shielding member 250 is provided along (to overlap with edge 271) an edge 271 of the pixel electrode 270 in the planar view, and an opening region 272 (surrounded by edge 255 of light shielding member 250) surrounded by the light shielding member 250 is a light transmission region through which light is transmitted without being blocked by the light shielding member 250. The non-opening region 273 disposed outside the opening region 272 is a region overlapped with the light shielding member 250 and is a light shielding region in which the light is shielded. In other words, the light shielding member 250 is provided outside the opening region 272 such that it is possible to serve role of defining the opening region 272.

The TFT 260 is disposed in a position in which the light shielding layer 252 that is the scanning line 261 and the light shielding layer 253 that is the data line 262 are overlapped (intersected) with each other, and provided in a region overlapping with the light shielding member 250.

The low refractive index insulator 230 is provided in a region overlapped with at least the light shielding member 250. The high refractive index insulator 240 is provided in contact with the low refractive index insulator 230 on the opening region 272. At least a part of the high refractive index insulator 240 is provided in a region overlapped with the pixel electrode 270.

More preferably, the low refractive index insulator 230 is provided to extend from the edge 255 of the light shielding member 250 to the outside (inside opening region 272), and cover an end surface of the light shielding layer 251 and the light shielding layer 252 (see FIG. 3). That is, the low refractive index insulator 230 is provided in the non-opening region 273. Correspondingly, the high refractive index insulator 240 is more preferably disposed so as to be separated from the edge 255 of the light shielding member 250 in the inside of the opening region 272, and provided so as not to be in contact with the light shielding member 250. In this manner, the high refractive index insulator 240 is provided so as to be in contact with the low refractive index insulator 230 over the entire outer edge of the opening region 272. That is, it is preferable that the high refractive index insulator 240 be provided so as to satisfy the entire region surrounded by the low refractive index insulator 230.

With reference to FIG. 3 and FIG. 4, a function as a waveguide of the high refractive index insulator 240 will be described. In the liquid crystal display device 100, a traveling direction is aligned in a direction appropriately perpendicular to the pixel electrode 270 such that light appropriately converted into parallel light flux is incident, but the incident light also includes a component that is obliquely incident while being shifted from a direction perpendicular to the pixel electrode 270.

Here, as an example of a case where the light is incident on the liquid crystal display device 100 from the counter substrate 300 side, a function as the waveguide of the high refractive index insulator 240 for incident light 500 obliquely incident on the opening region 272 will be described. The incident light perpendicularly incident on the opening region 272 travels straight in the opening region 272.

The incident light 500 obliquely incident on the opening region 272 transmits the alignment film 280, the pixel electrode 270, and the insulating layer 234 is incident on the high refractive index insulator 240, and is incident on the interface 241 between the high refractive index insulator 240 and the low refractive index insulator 230. The interface 241 is provided to be perpendicular to the pixel electrode 270. It is not essential for an actual device to be vertical (90°) without error, and an angle formed by the interface 241 with respect to the pixel electrode 270 (with respect to surface of pixel electrode 270) may be an angle close to vertical, for example, an angle within a range of 90°±10°. Since the angle of the interface 241 is an angle close to vertical, total reflection described below is likely to occur at the interface 241.

For example, in a case where the low refractive index insulator 230 is configured with the silicon oxide and the high refractive index insulator 240 is configured with the silicon oxynitride, for visible light of wavelength 550 nm, the refractive index of the low refractive index insulator 230 is 1.46 and the refractive index of the high refractive index insulator 240 is 1.64. In this example, according to Snell's law, when the incident angle of the incident light 500 incident on the interface 241 is 62° or more, that is, when the incident angle to the pixel electrode 270 is 28° (=90°−62°) or less, the incident light 500 is totally reflected at the interface 241 to a high refractive index insulator 240 side and not incident on the low refractive index insulator 230. Therefore, the incident light 500 is not incident on the non-opening region 273 that is a region in which the light shielding member 250 is provided in the planar view.

As described above, the high refractive index insulator 240 configures the waveguide which reflects light incident on the opening region 272 (on high refractive index insulator 240) at the interface 241 between the high refractive index insulator 240 and the low refractive index insulator 230, and propagates the light inside the high refractive index insulator 240. By causing total reflection at the interface 241, it is possible to efficiently propagate the incident light 500 inside the high refractive index insulator 240. Even in a case where reflection other than the total reflection occurs at the interface 241, it is possible to return the incident light 500 to the inside of the high refractive index insulator 240, that is, to the inside of the opening region 272 by the reflection.

By providing the high refractive index insulator 240, it is possible to suppress the incident light 500 from being deviated from the opening region 272, as compared to a case where the high refractive index insulator 240 is not provided. With this, for example, it is suppressed that the incident light 500 does not contribute to display, and light utilization efficiency is improved. In addition, for example, since it is possible to suppress irradiation of the incident light 500 on the TFT 260 (particularly, on semiconductor layer TFT 260) provided in a position overlapped with the light shielding member 250 in the planar view, an erroneous operation of the TFT 260 is suppressed. In this manner, with a simple structure in which the high refractive index insulator 240 is provided on the opening region 272, it is possible to suppress the incident light 500 from deviating from the opening region 272 and it is possible to improve the light utilization efficiency and the like.

Even in a case where light is incident on the liquid crystal display device 100 from the element substrate 200 side, similar to a case where light is incident from the counter substrate 300 side, the light can be prevented from being incident on the low refractive index insulator 230 by the high refractive index insulator 240. With this, for example, the light utilization efficiency is improved and the irradiation of the incident light 500 to the TFT 260 is suppressed. By the high refractive index insulator 240, an effect of suppressing the TFT 260 from being irradiated with light that is reflected by a polarizing plate and again incident on the element substrate 200 is also obtained.

A range in which the high refractive index insulator 240 is disposed in the thickness direction, it is preferable that the range include a range in the TFT 260 (particularly, semiconductor layer of TFT 260) is disposed in the thickness direction. More specifically, it is preferable that the range include a range from a surface 251a facing a TFT 260 side of the light shielding layer 251 to a surface 252a facing a TFT 260 side of the light shielding layer 252 in the thickness direction. By providing the high refractive index insulator 240 in this manner, it is possible to suppress the irradiation of the incident light to the TFT 260.

It is preferable that a range in which the high refractive index insulator 240 is disposed in the thickness direction include a range from the surface 251a facing the TFT 260 side of the light shielding layer 251 to the surface 252a facing the TFT 260 side of the light shielding layer 252 in the thickness direction over the entire region in which the high refractive index insulator 240 is provided in the planar view. With this, it is possible to further enhance the effect of suppressing the irradiation of the incident light to the TFT 260.

It is more preferable that a range in which the high refractive index insulator 240 is disposed in the thickness direction include a range from a surface 251b opposite to the surface 251a facing the TFT 260 side of the light shielding layer 251 to a surface 252b opposite to the surface 252a facing the TFT 260 side of the light shielding layer 252 in the thickness direction. With this, it is possible to further enhance the effect of suppressing the irradiation of the incident light to the TFT 260. A thickness of the high refractive index insulator 240 may be a thickness thicker than that illustrated in FIG. 3, for example, may be a thickness reaching the pixel electrode 270.

It is more preferable that the high refractive index insulator 240 be disposed to be separated from the edge 255 of the light shielding member 250 inside the opening region 272 and provided in contact with the low refractive index insulator 230 in the planar view. This is due to the following reason.

Since the high refractive index insulator 240 is separated from the light shielding member 250, the light shielding member 250 is not in contact with the high refractive index insulator 240 and not exposed in the high refractive index insulator 240. The light shielding member 250 is configured with metal, for example, and includes metallic luster. When the light shielding member 250 is exposed inside the high refractive index insulator 240, light propagating through the high refractive index insulator 240 is reflected by an edge of an end portion of the light shielding layer 251 or the like configuring the light shielding member 250.

As the traveling direction of the incident light 500 incident on the interface 241 is closer to parallel with the interface 241 (as incident angle to interface 241 is close to 90°), the total reflection at the interface 241 is likely to occur. However, since the light reflected at an edge of an end portion of the light shielding member 250 is not constant in a reflection direction, there is a possibility that reflected light having a small incident angle to the interface 241 (reflected light of which traveling direction is close to perpendicular to interface 241) occurs. Such reflected light is incident on the low refractive index insulator 230 and propagated by being deviated the opening region 272, and is more likely to be irradiated on the TFT 260.

By configuring the high refractive index insulator 240 to be separated from the light shielding member 250, it is possible to suppress reflection of the incident light 500 by an edge the light shielding member 250. Even in a configuration where the high refractive index insulator 240 is in contact with the light shielding member 250, by providing the high refractive index insulator 240, as compared to a case where the high refractive index insulator 240 is not provided, it is possible to obtain the effect of improving the light utilization efficiency and suppressing the light irradiation on the TFT 260 as described above.

Figure 5:
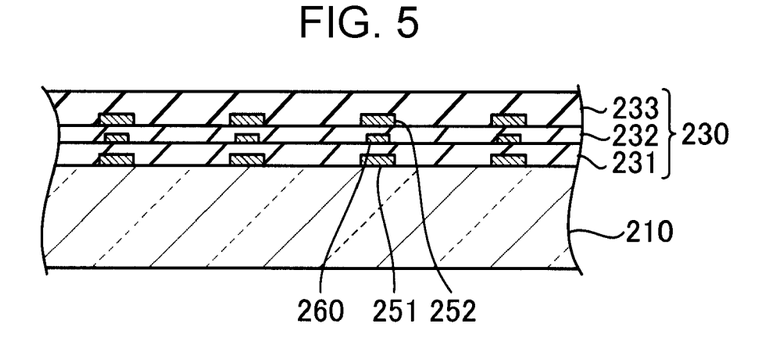
FIG. 5 is a schematic sectional view showing a manufacturing process of the liquid crystal display device according to the embodiment.
Figure 6:
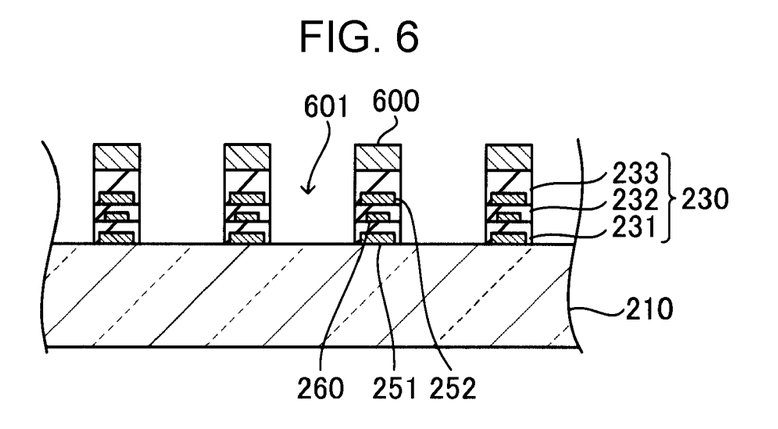
FIG. 6 is a schematic sectional view showing another manufacturing process of the liquid crystal display device according to the embodiment.
Figure 7:
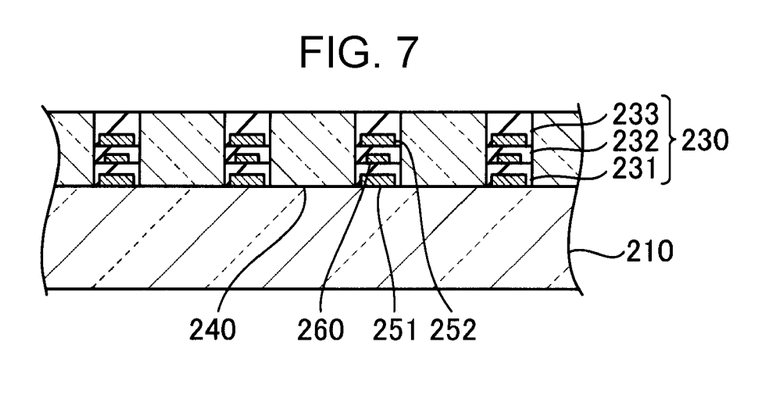
FIG. 7 is a schematic sectional view showing still another manufacturing process of the liquid crystal display device according to the embodiment.

Next, a manufacturing method of the liquid crystal display device 100 will be described. FIG. 5 to FIG. 7 are schematic sectional views showing a manufacturing process of the liquid crystal display device 100. FIG. 5 is referred. The light shielding layer 251 is formed on the base member 210 and the insulating layer 231 is formed on the base member 210 covering the light shielding layer 251. The TFT 260 is formed on the insulating layer 231 and the insulating layer 232 is formed on the insulating layer 231 covering the TFT 260. The light shielding layer 252 is formed on the insulating layer 232 and the insulating layer 233 is formed on the insulating layer 232 covering the light shielding layer 252. As a formation method of the insulating layer 231, the insulating layer 232, the insulating layer 233, the light shielding layer 251, the light shielding layer 252, and the TFT 260, a known method can be appropriately used.

FIG. 6 is referred. On the insulating layer 233, a mask 600 having an opening portion on a formation region of the high refractive index insulator 240 is formed. The insulating layer 233, the insulating layer 232, and the insulating layer 231 are configured with, for example, silicon oxide. By removing the insulating layer 233, the insulating layer 232, and the insulating layer 231 in the opening of the mask 600 by dry etching using, for example, a halogen-based etching gas such as fluorine, a concave portion 601 is formed on the insulating layer 233, the insulating layer 232, and the insulating layer 231. After the concave portion 601 is formed, the mask 600 is removed.

FIG. 7 is referred. In order to fill the concave portion 601, for example, silicon oxynitride is deposited by plasma chemical vapor deposition (CVD) and unnecessary portions are removed by chemical mechanical polishing (CMP) such that the upper surface is planarized. In this manner, the high refractive index insulator 240 buried in the concave portion 601 is formed. The high refractive index insulator 240 according to the present embodiment can be easily manufactured by burying the concave portion 601.

Thereafter, a structure on the upper side (liquid crystal layer 400 side) than the insulating layer 233 and the high refractive index insulator 240 is formed by appropriately using a known method such that the element substrate 200 is formed. Furthermore, by appropriately using a known technology, the counter substrate 300 is formed and the liquid crystal layer 400 is formed such that the liquid crystal display device 100 is manufactured.

Modification Example

The invention is not limited to the above-described embodiments, but can be applied to other embodiments as described below, for example, and various modifications are possible. In addition, in the modified embodiments and embodiments described below, one or a plurality of arbitrarily selected may be appropriately combined.

Figure 8:
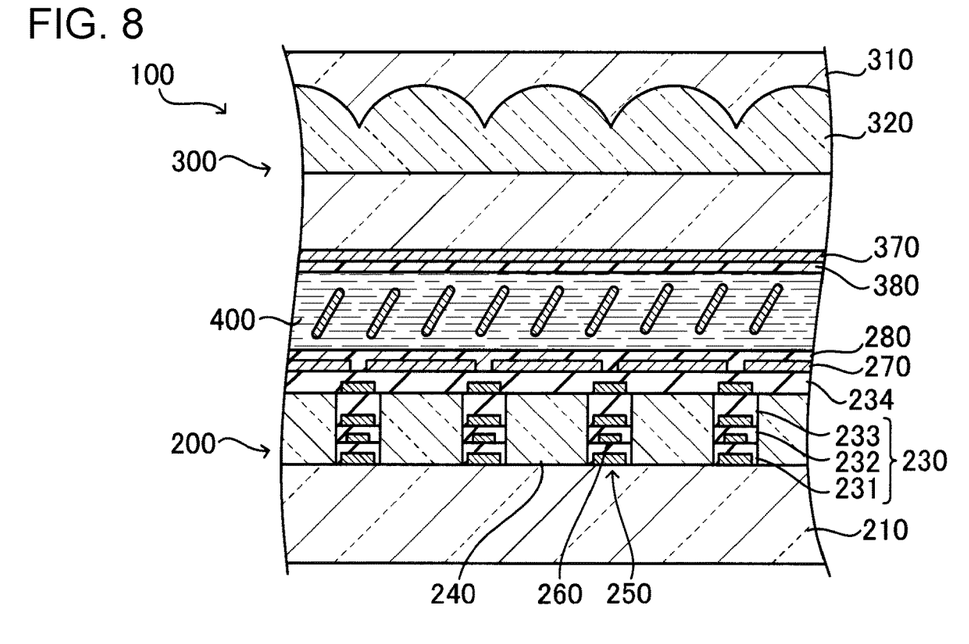
FIG. 8 is a schematic sectional view showing a configuration of a liquid crystal display device according to a first modification example.
Figure 9:
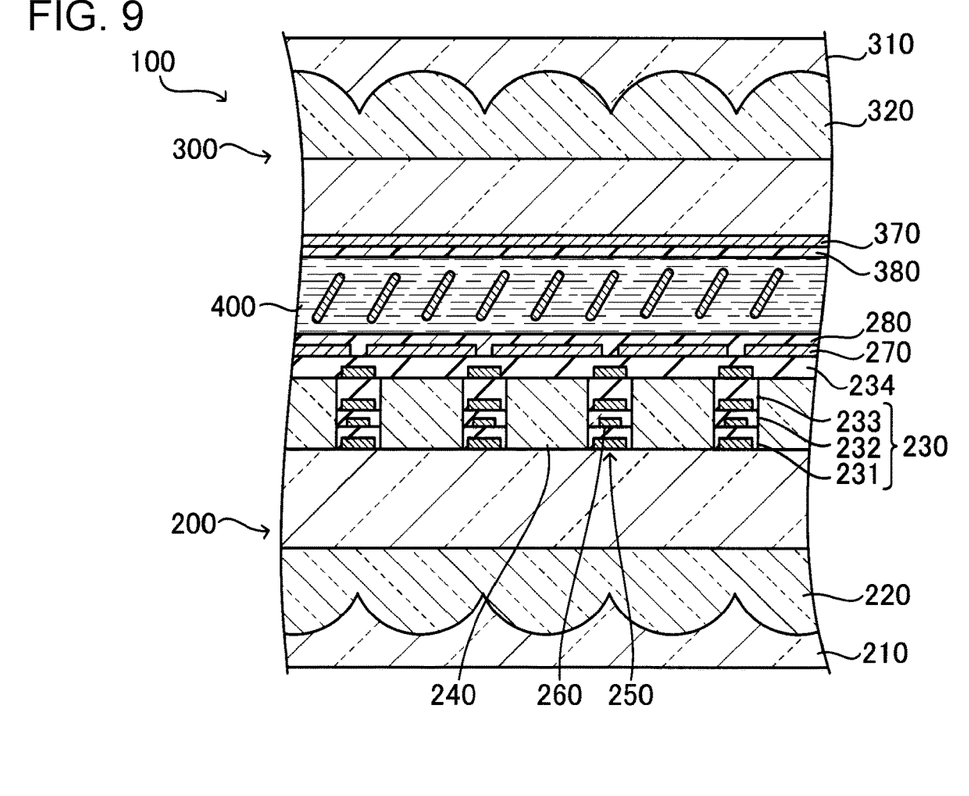
FIG. 9 is a schematic sectional view showing a configuration of a liquid crystal display device according to a second modification example.

For example, in order to further enhance the light utilization efficiency, the liquid crystal display device 100 including the microlens may be configured. FIG. 8 is a schematic sectional view showing the liquid crystal display device 100 according to the first modification example of the above-described embodiment. The microlens 320 is provided in a counter substrate 300 side in the liquid crystal display device 100 of the first modification example. FIG. 9 is a schematic sectional view showing the liquid crystal display device 100 according to the second modification example of the above-described embodiment. The microlens 320 is provided in the counter substrate 300 side of the liquid crystal display device 100 of the second modification example and the microlens 220 is provided in the element substrate 200 side thereof. The microlens 220 may be provided in the element substrate 200 side without providing the microlens 320 in the counter substrate 300 side.

The number of insulating layers (interlayer insulating film) and the number of the light shielding layers configuring the light shielding member 250 in the element substrate 200 may be changed as necessary. In addition, a range in which the high refractive index insulator 240 is provided in the thickness direction and a range in the planar view in the opening region 272 may be changed as necessary.

Application Example

Figure 10:
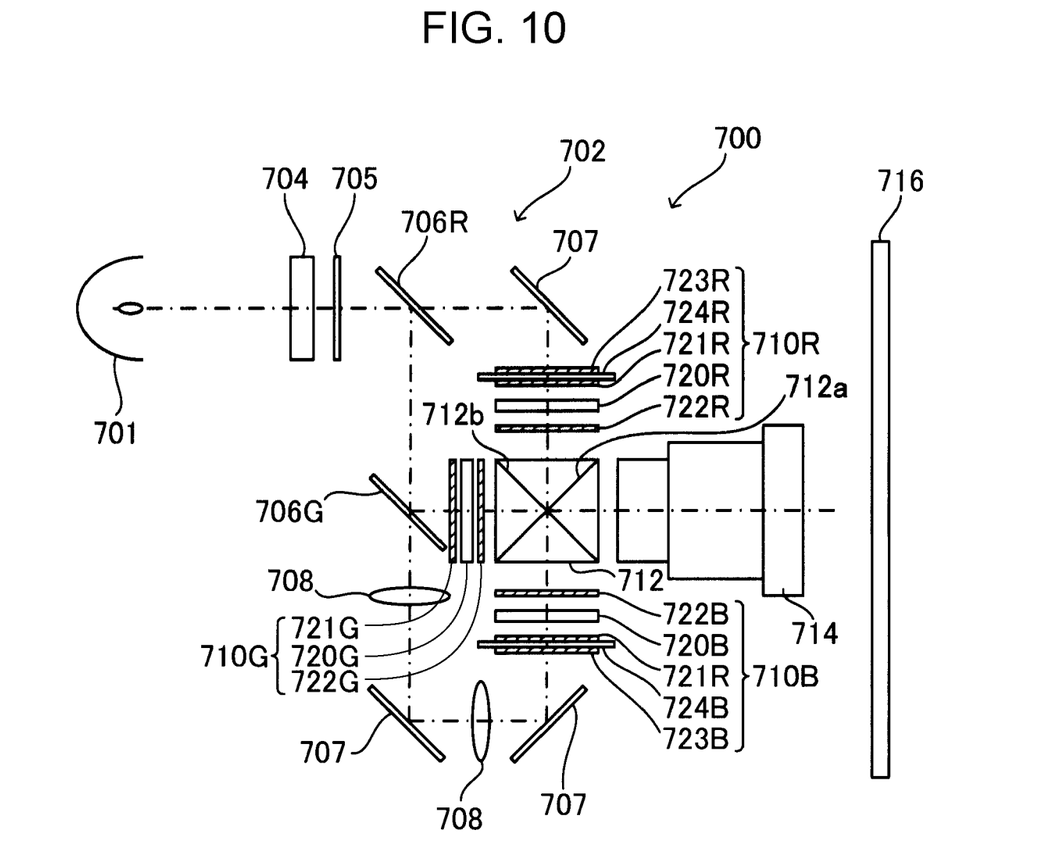
FIG. 10 is a schematic diagram showing an optical system of a projector according to an application example.

Next, as an application example of the above-described embodiment, a projection type display device (projector) will be described. FIG. 10 is a schematic diagram showing an example of an optical system of the projector 700 according to the application example. The projector 700 is configured by including a light source device 701, an integrator 704, a polarization conversion element 705, a color separation light guide optical system 702, a liquid crystal light modulation device 710R as a light modulation device, a liquid crystal light modulation device 710G, a liquid crystal light modulation device 710B, a cross dichroic prism 712, and the projection optical system 714. The liquid crystal display devices 720R, 720G, and 720B described below are provided in the liquid crystal light modulation devices 710R, 710G, and 710B. As the liquid crystal display devices 720R, 720G, and 720B, for example, it is possible to use the above-described liquid crystal display device 100.

The light source device 701 supplies light including red light (hereinafter, referred to as "R light") that is a first color light, green light (hereinafter, referred to as "G light") that is a second color light, and blue light (hereinafter, referred to as "B light") that is a third color light. As the light source device 701, for example, an extra-high pressure mercury lamp can be used.

The integrator 704 equalizes illuminance distribution of light emitted from the light source device 701. Light of which the illuminance distribution is equalized is converted into polarized light having a specific oscillation direction, for example, s-polarized s-polarized light with respect to, a reflecting surface of the color separation light guide optical system 702 by the polarization conversion element 705. The light converted into the s-polarized light is incident on an R light transmitting dichroic mirror 706R configuring the color separation light guide optical system 702.

The color separation light guide optical system 702 is configured by including the R light transmitting dichroic mirror 706R, a B light transmitting dichroic mirror 706G, three reflecting mirrors 707, and two relay lenses 708.

The R light transmitting dichroic mirror 706R transmits the R light, and reflects the G light and the B light. The R light transmitted through the R light transmitting dichroic mirror 706R is incident on the reflecting mirror 707.

The reflecting mirror 707 bends the optical path of the R light by 90 degrees. The R light bent by the optical path is incident on a liquid crystal light modulation device 710R for the R light. The liquid crystal light modulation device 710R for the R light is a transmissive liquid crystal device which modulates the R light according to the image signal.

The liquid crystal light modulation device 710R for the R light includes a $\lambda/2$ phase difference plate 723R, a glass plate 724R, a first polarizing plate 721R, a liquid crystal display device 720R, and a second polarizing plate 722R. The $\lambda/2$ phase difference plate 723R and the first polarizing plate 721R are arranged in a state of being in contact with a light-transmitting glass plate 724R which does not change a polarization direction. In FIG. 10, the second polarizing plate 722R is independently provided, but the second polarizing plate 722R may be arranged in a state of being in contact with an exit surface of the liquid crystal display device 720R or an incident surface of the cross dichroic prism 712.

The G light and the B light reflected by the R light transmitting dichroic mirror 706R can be bent by 90 degrees in the optical path. The G light and the B light of which the optical path is bent are incident on the B light transmitting dichroic mirror 706G. The B light transmitting dichroic mirror 706G reflects the G light and transmits the B light. The G light reflected by the B light transmitting dichroic mirror 706G is incident on the liquid crystal light modulation device 710G for the G light. The liquid crystal light modulation device 710G for the G light is the transmissive liquid crystal device which modulates the G light according to the image signal. The liquid crystal light modulation device 710G for the G light includes a liquid crystal display device 720G, a first polarizing plate 721G, and a second polarizing plate 722G.

The G light incident on the liquid crystal light modulation device 710G for the G light is converted into the s-polarized light. The s-polarized light incident on the liquid crystal light modulation device 710G for the G light transmits the first polarizing plate 721G as it is, and is incident on the liquid crystal display device 720G. The s-polarized light incident on the liquid crystal display device 720G is modulated according to the image signal such that the G light is converted into p-polarized light. By the modulation of the liquid crystal display device 720G, the G light converted into the p-polarized light is emitted from the second polarizing plate 722G. In this manner, the G light modulated by the liquid crystal light modulation device 710G for the G light is incident on the cross dichroic prism 712.

The B light transmitted through the B light transmitting dichroic mirror 706G is incident on the liquid crystal light modulation device 710B for the B light through two relay lenses 708 and two reflecting mirrors 707.

The liquid crystal light modulation device 710B for the B light is the transmissive liquid crystal device which modulates the B light according to the image signal. The liquid crystal light modulation device 710B for the B light includes a $\lambda/2$ phase difference plate 723B, a glass plate 724B, a first polarizing plate 721B, a liquid crystal display device 720B, and a second polarizing plate 722B.

The B light incident on the liquid crystal light modulation device 710B for the B light is converted into the s-polarized light. The s-polarized light incident on the liquid crystal light modulation device 710B for the B light is converted into the p-polarized light by the $\lambda/2$ phase difference plate 723B. The B light converted into the p-polarized light transmits the glass plate 724 and the first polarizing plate 721B as it is and is incident on the liquid crystal display device 720B. The p-polarized light incident on the liquid crystal display device 720B is modulated according to the image signal such that the B light is converted into the s-polarized light. By the modulation of the liquid crystal display device 720B, the B light converted into the s-polarized light is emitted from the second polarizing plate 722B. The B light modulated by the liquid crystal light modulation device 710B for the B light is incident on the cross dichroic prism 712.

In this manner, the R light transmitting dichroic mirror 706R and the B light transmitting dichroic mirror 706G configuring the color separation light guide optical system 702 separates light supplied from the light source device 701 into the R light that is the first color light, the G light that is the second color light, and the B light that is the third color light.

The cross dichroic prism 712 that is a color combining optical system is configured by disposing two dichroic films 712a and 712b orthogonally in an X shape. The dichroic film 712a reflects the B light and transmits the G light. The dichroic film 712b reflects the R light and transmits the G light. In this manner, the cross dichroic prism 712 combines the R light, the G light, and the B light modulated by the liquid crystal light modulation device 710R for the R light, the liquid crystal light modulation device 710G for the G light, and the liquid crystal light modulation device 710B for the B light, respectively.

The projection optical system 714 projects light combined by the cross dichroic prism 712 on the screen 716. With this, it is possible to obtain a full color image on the screen 716. As described above, the above-described liquid crystal display device 100 can be used for the projector 700 as an example.

The above-described liquid crystal display device 100 can be used for a front projection type projector which projects an image from a side of observing a projection image or can be used for a rear projection type projector which projects the image from a side opposite to the side for observing the projection image.

An electronic device to which the liquid crystal display device 100 can be applied is not limited to the projector 700. The liquid crystal display device 100 may be used as a display unit of an information terminal device such as a projection type HUD (head up display), a direct view type HMD (head mounted display), an electronic book, a personal computer, a digital still camera, a liquid crystal television, a view finder type or monitor direct view type video recorder, a car navigation system, an electronic notebook, and a POS.

In the above description, as an example of an electro-optical device (or display device) including the element substrate 200 (substrate for electro-optical device) having the high refractive index insulator 240 configuring the waveguide, the liquid crystal display device 100 is described. However, the embodiment is not limited to such a configuration. The high refractive index insulator 240 configuring the waveguide may be applied to another electro-optical device (or display device) such as an electrophoretic display device and an organic electroluminescence device in order to, for example, improve the light utilization efficiency.

The entire disclosure of Japanese Patent Application No. 2017-086946, filed Apr. 26, 2017 is expressly incorporated by reference herein.

What is claimed is:

1. An electro-optical device comprising:
   a pair of substrates;
   a liquid crystal layer that is interposed between the pair of substrates, the pair of substrates and the liquid crystal layer there-between are stacked in a stacking direction;
   one of the pair of substrates including:
      a pixel electrode;
      a light shielding member that is provided along an edge of the pixel electrode in a planar view, the light shielding member including a first light shielding layer and a second light shielding layer that is disposed between the pixel electrode and the first light shielding member in the stacking direction;
      a semiconductor element that is provided between the first light shielding layer and the second light shielding layer in the stacking direction;
      a first insulator that is provided in a region overlapped with the light shielding member in the planar view, the first insulator including a first insulating layer covering the first light shielding layer, a second insulating layer covering the semiconductor element, and a third insulating layer convering the second light shielding layer, the first insulating layer having a first side surface in a region surrounded by the light shielding member, the second insulating layer having a second side surface in the region surrounded by the light shielding member, the third insulating layer having a third side surface in the region surrounded by the light shielding member; and
      a second insulator that is provided to be in contact with the first side surface of the first insulating layer, the second side surface of the second insulating layer, and the third side surface of the third insulating layer in the region surrounded by the light shielding member in the planar view, a refractive index of the second insulator being higher than that of the first insulator, the second insulator being configured as a waveguide which reflects incident light at an interface between the first insulator and the second insulator; and
   a microlens that is provided on a side opposite to the liquid crystal layer with respect to the second insulator such that the second insulator is between the liquid crystal layer and the microlens, an edge of the lens member being disposed outside the second insulator in the planar view,
   wherein the one of the pair of substrates includes a first sub layer adjacent to the second insulator and a second sub layer distal from the second insulator, and the first sub layer is between the second insulator and the microlens in the stacking direction.

2. The electro-optical device according to claim 1, further comprising:
   a range in which the second insulator is disposed in the stacking direction includes a range from a surface facing a semiconductor element side of the first light shielding layer to a surface facing a semiconductor element side of the second light shielding layer in the stacking direction, wherein the second light shielding layer is overlapped with the first light shielding layer in the planar view.

3. An electronic device comprising the electro-optical device according to claim 2.

4. The electro-optical device according to claim 1, wherein the second insulator is disposed by being separated from the light shielding member.

5. An electronic device comprising the electro-optical device according to claim 4.

6. The electro-optical device according to claim 1, wherein the waveguide totally reflects and propagates the incident light incident on the interface.

7. An electronic device comprising the electro-optical device according to claim 6.

8. The electro-optical device according to claim 1, wherein an interface between the first insulator and the second insulator forms an angle in a range of 90° ±10° with respect to the pixel electrode.

9. An electronic device comprising the electro-optical device according to claim 8.

10. An electronic device comprising the electro-optical device according to claim 1.

11. The electro-optical device according to claim 1, wherein the first insulator is made of silicon oxide and the second insulator is made of oxynitride or silicon nitride.

12. The electro-optical device according to claim 1, the first insulator includes additional insulating layers, the light shielding member includes additional light shielding layers and the additional insulating layers and additional light shielding layers are alternately stacked.

13. The electro-optical device according to claim 1, wherein the microlens has a convex surface facing the liquid crystal layer and a flat surface facing the second sub layer.

14. The electro-optical device according to claim 1, wherein the first sub layer has a flat surface facing the microlens.

15. A transmissive liquid crystal display device comprising:
   a pair of substrates;
   a liquid crystal layer that is interposed between the pair of substrates, the pair of substrates and the liquid crystal layer there-between are stacked in a stacking direction;
   one of the pair of substrates including:
      a plurality of pixels having an opening region and transmitting incident light through the opening region;
      a pixel electrode that is provided in the opening region of the pixel;
      a light shielding member that is provided in a non-opening region surrounding the opening region, the light shielding member including a first light shielding layer and a second light shielding layer that is disposed between the pixel electrode and the first light shielding member in the stacking direction;
      a semiconductor element that is provided between the first light shielding layer and the second light shielding layer in the stacking direction;
      a first insulator that is provided in the non-opening region, and overlaps at least a part of the first insulator with the light shielding member, the first insulator including a first insulating layer covering the first light shielding layer, a second insulating layer covering the semiconductor element, and a third insulating layer covering the second light shielding layer, the first insulating layer having a first side surface in a region surrounded by the light shielding member, the second insulating layer having a second side surface in the region surrounded by the light shielding member, the third insulating layer having a third side surface in the reegion surrounded by the light shielding member; and a second insulator that is provided in contact with the first side surface of the first insulating layer, the second side surface of the second insulating layer, and the third side surface of the third insulating layer in a region in which at least a part of the second insulator is overlapped with the pixel electrode, and provided in the entire region surrounded by the first insulator; and a microlens that is provided on a side opposite to the liquid crystal layer with respect to the second insulator such that the second insulator is between the liquid crystal layer and the microlens, an edge of the lens member being disposed outside the second insulator in the planar view, wherein a refractive index of the second insulator is higher than that of the first insulator, light propagates in the second insulator by totally reflecting the light incident on the opening region, in an interface between the first insulator and the second insulator, the one of the pair of substrates includes a first sub layer adjacent to the second insulator and a second sub layer distal from the second insulator, and the first sub layer is between the second insulator and the microlens in the stacking direction.

16. The transmissive liquid crystal display device according to claim 15, further comprising:

a range in which the second insulator is disposed in the stacking direction includes a range from a surface facing a semiconductor element side of the first light shielding layer to a surface facing a semiconductor element side of the second light shielding layer in the stacking direction, wherein the semiconductor element is provided in a position in which the first light shielding layer and the second light shielding layer are overlapped with each other in the planar view, the second light shielding layer is disposed in a position different from that of the first light shielding layer in the stacking direction, and the second light shielding layer has a portion that is overlapped with the first light shielding layer in the planar view.

17. The transmissive liquid crystal display device according to claim 15, wherein the second insulator is disposed by being separated from an inside of the opening region with respect to an edge of the light shielding member.

18. An electro-optical device comprising:

a pair of substrates;

a liquid crystal layer that is interposed between the pair of substrates, the pair of substrates and the liquid crystal layer there-between are stacked in a stacking direction;

one of the pair of substrates including:

a pixel electrode;

a light shielding member that is provided between the substrate and the pixel electrode in a planar view, the light shielding member including a first light shielding layer and a second light shielding layer that is disposed between the pixel electrode and the first light shielding member in the stacking direction;

a semiconductor element that is provided between the first light shielding layer and the second light shielding layer in the stacking direction;

a first insulator that is overlapped with the light shielding member in the planar view, the first insulator including a first insulating layer covering the first light shielding layer, a second insulating layer covering the semiconductor element, and a third insulating layer covering the second light shielding layer, the first insulating layer having a first side surface in a region surrounded by the light shielding member, the second insulating layer having a second side surface in the region surrounded by the light shielding member, the third insulating layer having a third side surface in the region surrounded by the light shielding member; and a second insulator that is provided to be in contact with the first side surface of the first insulating layer, the second side surface of the second insulating layer, and the third side surface of the third insulating layer in the planar view, and provided in an opening region surrounded by the light shielding member, a refractive index of the second insulator being higher than that of the first insulator; and a microlens that is provided on a side opposite to the liquid crystal layer with respect to the second insulator such that the second insulator is between the liquid crystal layer and the microlens, an edge of the lens member being disposed outside the second insulator in the planar view, wherein the second insulator is disposed by being separated from the light shielding member, the one of the pair of substrates includes a first sub layer adjacent to the second insulator and a second sub layer distal from the second insulator, and the first sub layer is between the second insulator and the microlens in the stacking direction.

19. The electro-optical device according to claim 18, further comprising:

a range in which the second insulator is disposed in the stacking direction includes a range from a surface facing a semiconductor element side of the first light shielding layer to a surface facing a semiconductor element side of the second light shielding layer in the stacking direction, wherein the second light shielding layer overlapped with the first light shielding layer in the planar view.

20. The electro-optical device according to claim 18, wherein a surface of the first light shielding layer facing the substrate is flush with a surface of the second insulator facing the substrate.

* * * * *